June 10, 1958 J. P. ECKERT, JR 2,838,746

MAGNETIC AMPLIFIER BISTABLE DEVICE

Filed April 5, 1955 2 Sheets-Sheet 1

INVENTOR
JOHN PRESPER ECKERT, JR.

BY Charles C. English

AGENT

MAGNETIC AMPLIFIER BISTABLE DEVICE

Filed April 5, 1955 2 Sheets-Sheet 2

INVENTOR
JOHN PRESPER ECKERT, JR.

BY Charles C. English

AGENT 2,838,746

MAGNETIC AMPLIFIER BISTABLE DEVICE

John Presper Eckert, Jr., Philadelphia, Pa., assignor, by mesne assignments, to Sperry Rand Corporation, New York, N. Y., a corporation of Delaware Application April 5, 1955, Serial No. 499,361

21 Claims. (Cl. 340—174)

This invention relates to bistable devices and more particularly to such devices that employ one or more magnetic amplifiers in connection therewith.

Bistable devices employing one or more magnetic amplifiers have been previously known, but suffer from certain disadvantages, particularly with respect to the input circuit.

It is a primary object of this invention to overcome these disadvantages.

Another object of the invention is to provide a magnetic amplifier bistable device with improvements in regard to the input circuit.

Another object of the invention is to provide a magnetic amplifier and bistable device with an improved connection between the feedback circuit and the input circuits.

Still another object of the invention is to provide a magnetic amplifier bistable device in which certain of the input signals have opposite polarity from the output signals.

Another object of the invention is to provide a magnetic amplifier bistable device that is lower in cost and more satisfactory in operation than prior such devices.

In carrying out the aforesaid objects, a complementing magnetic amplifier in combination with suitable delay means is employed, and which has a signal input winding responsive to signals of one (positive) polarity. In the absence of input signals, there are output signals of the opposite polarity. There is a diode gate having three control inputs. The output of the diode gate controls said signal winding. The three inputs of the diode gate are respectively controlled by a source of clock pulses, a reset input and a feedback circuit. The set input feeds its signal winding directly. The aforesaid arrangement enables the improvements recited in the aforesaid objects to be achieved.

Figures 1, 2, 3, 4:
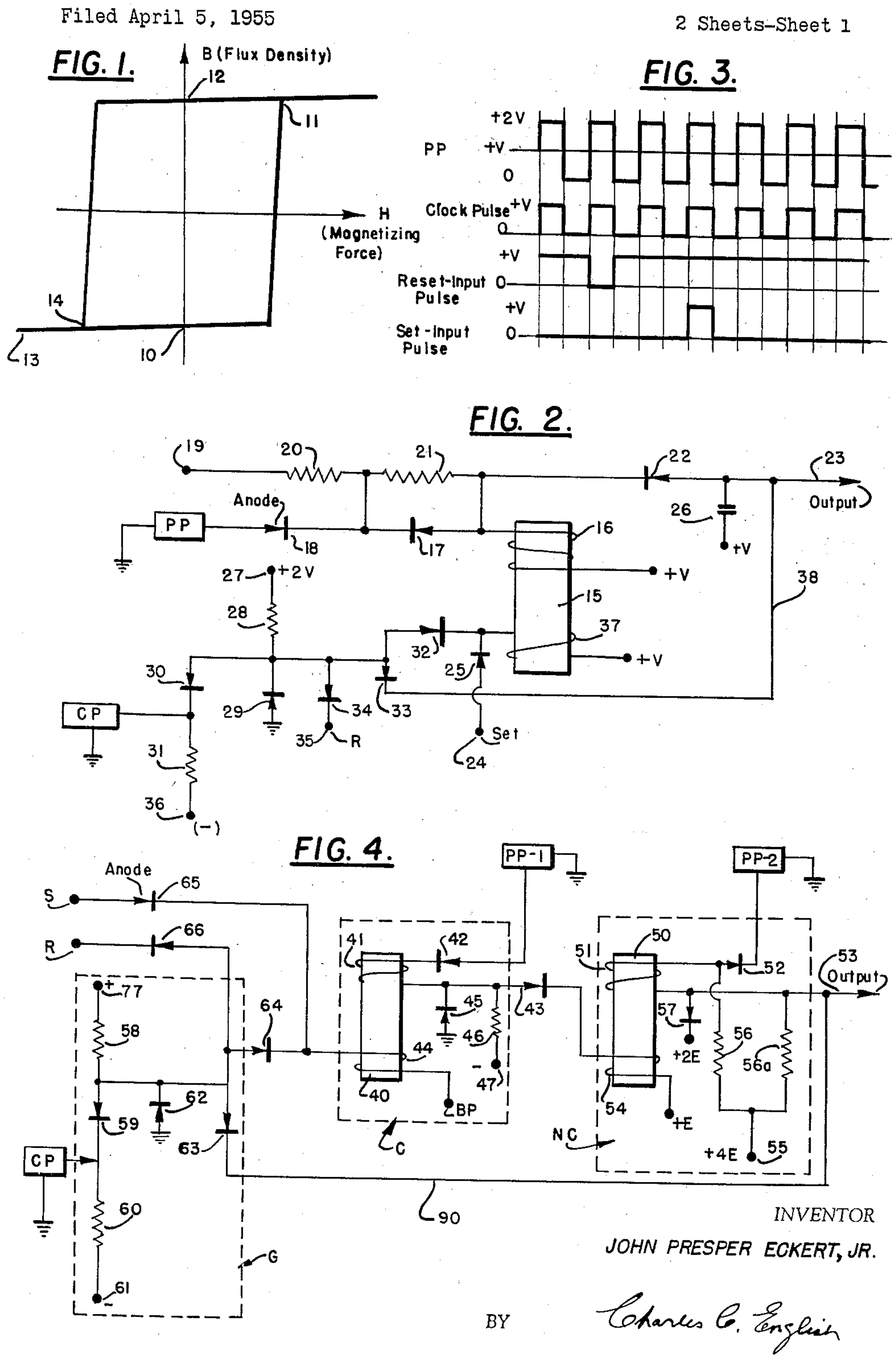
Figure 1 is an idealized hysteresis loop for the core materials employed hereinafter.
Figure 2 is a schematic diagram of one form of the invention.
Figure 3 is a timing diagram for the devices shown in Figure 2.
Figure 4 is a schematic diagram of another form of the invention.

The cores of the magnetic amplifiers hereinafter referred to may be made of a variety of materials, among which are the various types of ferrites and the various magnetic tapes, including Orthonik and 4—79 Moly-permalloy. These materials may have different heat treatments to give them different properties. The magnetic material employed in the cores should preferably but not necessarily have a substantially rectangular hysteresis loop (as shown in Figure 1). Cores of this character are well known in the art. In addition to the wide variety of materials available, the cores may be constructed in a number of geometries including both closed and open paths; for example, cup-shaped, strips, and toroidal-shaped cores are possible. Those skilled in the art understand that when the core is operating on the horizontal (or substantially saturated) portions of its hysteresis loop, the core is generally similar in operation to an air core, in that the coil on the core is of low impedance. On the other hand, when the core is operating on the vertical (or unsaturated) portions of the hysteresis loop, the impedance of the coil on the core will be high.

In Figure 2 there is shown a bistable device employing a parallel type of magnetic amplifier. This amplifier includes a core 15 having a power winding 16 thereon. This power winding is connected through rectifiers 17 and 18 to a source of power pulses PP, which has a waveform as shown in Figure 3. Terminal 19 is connected to a source of potential below ground, and therefore negative, and is also connected through resistors 20 and 21 to rectifier 22, and to output terminal 23. Resistor 21 is shunted across rectifier 17. In the absence of any signal through the input winding 37, when the potential of the source PP rises to +2V, current flows therefrom through rectifier 18, resistor 20, to negative source 19. This cuts off rectifier 17 and renders the potential at the cathode of that rectifier at or above ground, so that no current then flows through rectifier 22, and there is no output at 23. There may, however, be a flow of current through coil 16 since the source of power pulses PP has risen to a potential +2V, which is greater than the potential of the lower end of coil 16. Therefore, current may flow from source PP, rectifier 18, resistor 21, power winding 16, to source +V. This applies a positive magnetizing force to the core.

Assuming that the core was at negative remanence 10 (Figure 1) prior to this pulse, the pulse will drive it along an unsaturated portion of the hysteresis loop to point 11. At the end of this positive pulse, the core will move to positive remanence 12. During the spaces between power pulses of source PP the potential of that source will be zero and current will now flow through coil 16 in the opposite direction to the previous flow therethrough. The path now available for current flow is from source +V, coil 16, rectifier 17, resistor 20, to negative source 19. This applies a negative magnetizing force to the core and drives it from positive remanence 12 to point 14. At the conclusion of this interval the core will return to negative remanence 10. It follows that the core will be subjected to positive and negative magnetizing forces alternately and under the power pulse conditions assumed will travel around the hysteresis loop without reaching saturation. Hence, the coil 16 will always have high impedance. During the spaces between positive pulses of source PP there will be output pulses passing through output rectifier 22. This follows from the fact that the flow of current through coil 16 is insufficient to create enough drop across resistor 20 to raise the potential at rectifier 22 above ground, and therefore the potential will remain at ground and there will be negative-going output signals from the device. These negative output signals, occurring intermediate positive excursions of source PP, also charge condenser 26 during these time intervals. In time intervals between the charging of condenser 26, the said condenser discharges thereby to provide a delayed negative output pulse which maintains output point 23 and line 38 at a negative potential. As a result of this operation, the potential at point 23 and on line 38 comprises a succession of negative pulses occurring both concurrent with and intermediate positive excursions of source PP, and a substantially continuous negative potential therefore appears at point 23 and on line 38. This substantially continuous negative potential at output point 23, for instance, corresponds to a first stable state for the device.

The negative feedback potential on line 38, occurring during this first stable state, causes a current to pass through rectifier 33 and cut off rectifier 32, thus preventing flow of current through the signal winding 37. Hence, the device will remain in the aforesaid stable state until a signal is received at the set input 24. In event a positive input pulse is received on input 24, it will flow through rectifier 25 and signal winding 37. Assuming that this signal occurs simultaneously with a positive magnetizing force set up by coil 16 (which occurs when source PP is at +2V), the core will have two equal and opposite magnetizing forces thereon and consequently, will remain at negative remanence 10. During the space following the last-mentioned power pulse, a negative magnetizing force from terminal 19 will again be applied to the core 15 through winding 16 and the core will be driven to negative saturation 13. In this case, the winding 16 on the core will have low impedance and therefore the righthand end of resistor 21 will no longer be at ground but will in fact be positive, whereby rectifier 22 is cut off and no signal will flow to the condenser 26 or to the output 23. The potential at output point 23, and on feedback line 38, accordingly rises to a potential positive with respect to ground, representative of a second stable state for the device. Consequently, the negative bias on the feedback path 38 will no longer appear, especially since the lower end of the condenser 26 is connected to a source of positive potential. There is accordingly no longer a negative-going potential being fed to rectifier 33 to cut off rectifier 32. Moreover, the reset input 35, which is connected to rectifier 34, is held at a potential of +V until a reset input signal is received. In addition, concurrently with each power pulse, there is a clock pulse applied by clock pulse generator CP to the cathode of rectifier 30 thereby cutting off this rectifier. Hence, during the periods of application of clock pulses, current may flow from positive source 27, resistor 28, rectifier 32, signal winding 37, to ground. This applies a negative magnetizing force to the core 15 which cancels the positive magnetizing force due to flow of current from source PP through resistor 21 and coil 16 at the same time. Consequently, during the next space between pulses of source PP, a negative magnetizing force will again be set up in the core by virtue of a flow of current from source 19 through resistor 20 and winding 16. This negative magnetizing force will again drive the core to negative saturation 13. Since the winding 16 will have low impedance during this interval, the cathode of rectifier 22 will remain positive and therefore cut off, and the potential of feedback path 38 will remain more positive than ground, i. e. the device will remain in its said second stable state. Hence, the same cycle of events will repeat itself. In other words, concurrently with each clock pulse, the source 27 will energize the signal winding 37 and provide a negative magnetizing force that will cancel the positive magnetizing force that occurs at the same time due to power pulse generator PP. Hence, during the spaces between power pulses, the negative terminal 19 will supply current through winding 16 that will apply negative magnetizing forces to the core, driving it to saturation and rendering the coil 16 a low impedance one, whereby the cathode of rectifier 22 will remain positive.

The aforesaid cycle of events can be terminated only when the reset terminal 35 is effectively grounded, as shown in Figure 3. The grounding of terminal 35 causes a flow of current from positive source 27, through resistor 28, rectifier 34 to ground 35. Since rectifier 34 has negligible resistance, all of the potential of source 27 appears across resistor 28 and therefore no current flows through the signal winding 37. Hence, the signal winding no longer establishes any magnetizing force in the core: hence, the next positive pulse of source PP will flow through coil 16 and apply a positive magnetizing force to the core and drive it from negative remanence 10 to point 11. During the next space between power pulses, the negative terminal 19 will cause current to flow through winding 16 and establish a negative magnetizing force tending to drive the core from 12 to 14. Hence, the original cycle of operations has again been established and a negative potential will appear on feedback path 38 which will hold the device in this stable state, i. e. its said first stable state, until another signal is received at set input 24.

The source 27, resistor 28, rectifier 29, rectifier 30, resistor 31 and negative source 36, together with rectifier 34, terminal 35 and rectifier 33, form a diode gate of known construction. This diode gate has an output connected to the anode of output rectifier 32 and it has three control inputs, one of which is the cathode of rectifier 33 which is connected to feedback path 38; another of which is the cathode of rectifier 34 which is connected to reset terminal 35; and the third of which is the cathode of rectifier 30 which is connected to the clock pulse generator CP.

It is noted that even though the right lower end of coil 37 is connected to a source of potential at +V volts, it is possible to permit flipping to another stable state by applying an input signal of only +V volts at set input 24. The reason for this is as follows. Assume the core is at negative remanence 10 when source PP goes positive to +2V. This tends to drive the upper end of coil 16 positive relative to its other end and tends to drive the upper end of coil 37 negative relative to its lower end. However, the input signal at 24 will hold the upper end of coil 37 at +V and will prevent it from going negative relative to its lower end. It will therefore oppose flux change in the core due to the positive excursion of source PP and will therefore hold the core at negative remanence 10.

Figure 4 is a modified form of the invention in which a series type complementing magnetic amplifier C replaces the parallel type of magnetic amplifier of Figure 2, and in which a non-complementing magnetic amplifier NC is used as the delay means in place of the condenser 26 of Figure 2. Otherwise the construction and mode of operation of Figures 2 and 4 are the same.

Figure 5:
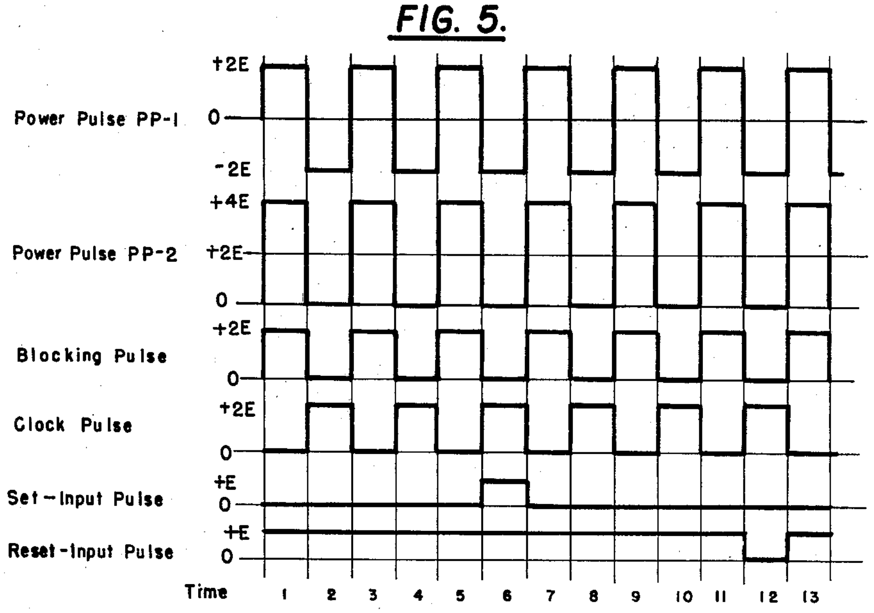
Figure 5 is a timing diagram for the device of Figure 4.

In describing Figure 4, the operation of the complementing magnetic amplifier C will be explained first. This amplifier has a core 40 composed of any of the materials hereinbefore mentioned. This core has a power winding 41 connected through rectifier 42 to the source of power pulses PP—1. In the absence of any signal in the input winding 44, when the source PP—1 goes positive, as shown in Figure 5, it will drive the core from positive remanence 12 to positive saturation (see Figure 1). During the spaces between power pulses of source PP—1, the core will return to positive remanence 12. In view of the fact that under these circumstances the core is always operating along a saturated portion of its hysteresis loop, the winding 41 will have low impedance and there will be a large current therethrough due to each positive power pulse of source PP—1, and hence, a large current through output wire 43 and signal winding 54 of the non-complementing amplifier NC. When the source of power pulses PP—1 goes negative, rectifier 42 is cut off and no current can flow in the circuit. Moreover, no current can flow in the signal winding 44 during the period when the source PP—1 is going positive, since the blocking pulse generator BP applies a blocking pulse (see Figure 5) to the cathode of rectifier 64 and prevents any flow of current through the signal winding 44. In event a positive pulse is applied at the set input S, during the spaces between blocking pulses, that is during the intervals between positive excursions of source PP—1, such a pulse will flow through the signal winding 44 and apply a negative magnetizing force to the core, driving it from positive remanence 12 to point 14 of Figure 1. Hence, at the beginning of the next positive power pulse of source PP—1, the core will be at negative remanence 10 and will be driven by that power pulse to point 11. This is an unsaturated portion of the hysteresis loop and therefore power winding 41 has high impedance and very little current will flow through it to the output 43. The small current that does flow is known as a sneak current. The sneak current may be eliminated from the output 43 by adding a rectifier 45, a resistor 46 and a source of negative potential 47, as shown. If the flow of current from ground through rectifier 45, resistor 46 to negative pole 47 is substantially equal to the so-called sneak current, the sneak current will be cancelled.

The construction and mode of operation of the non-complementing magnetic amplifier NC will now be described, reference being made to the schematic diagram of Figure 4 and the timing diagram of Figure 5. The core 50 has a power winding 51 connected through rectifier 52 to the source PP—2. This winding is also connected to the output 53. There is a signal winding 54. In the absence of current flow through the signal winding 54, when the potential of source PP—2 is at ground, current will flow from source 55, resistor 56a, power winding 51, rectifier 52, through source PP—2 to ground, and apply a negative magnetizing force to the core 50. During the intervals when the source PP—2 goes positive, the rectifier 52 will be cut off, but current may now flow from the positive source 55 (now at +4E volts) through resistor 56, power winding 51, rectifier 57 to source of potential +2E to ground. This applies a positive magnetizing force to the course. Hence, when source PP—2 drops to ground potential the core is driven from positive remanence 12 to point 14, and during the positive excursions of source PP—2 the core is driven by source 55 from negative remanence 10 to point 11 on the loop. As a result, in the absence of signals at the input 54, the core repeatedly traverses its hysteresis loop without saturation. The mode of operation of amplifier NC is as follows. In the absence of any input to amplifier NC, and assuming that the core is initially at its plus remanence operating point, the application of a negative-going pulse from source PP—2 to coil 51 via rectifier 52 will cause a current flow from source 55 via resistor 56a, coil 51, and rectifier 52 to source PP—2, whereby core 50 may be flipped from its plus remanence operating point to, but preferably not into, negative saturation. Inasmuch as core 50 is in such circumstance operating on a substantially unsaturated portion of the hysteresis loop thereof, coil 51 will present a high impedance, and only a small current will flow in the said path 55, 56a, 51, 52.

Consequently, and by virtue of the sneak suppressor action of resistor 56a in combination with rectifier 57, the output potential of amplifier NC will be substantially +2E. When source PP—2 next produces a positive pulse, rectifier 52 will be biased off, and current will now flow from source 55 via resistor 56, coil 51, and rectifier 57 to source +2E. Inasmuch as this current flow in coil 51 is in the opposite direction to the first described current flow, core 50 may now be driven from the beginning of negative saturation to, but not into, positive saturation via negative remanence. Whereby, in the absence of any input via coil 54, the above described action repeats. If, however, an input should be applied to coil 54 concurrent with a positive pulse from source PP—2, the positive magnetomotive force due to current flow in the path 55, 56, 51, 57 will be substantially cancelled by current flow in coil 54. Hence, since core 50 will be at negative remanence when next the potential of source PP—2 goes to ground, core 50 will be driven from negative remanence into negative saturation, a large current will, therefore, flow in the path 55, 56a, 51, 52, and the potential at the output 53 will be substantially ground potential.

If it now be assumed that there has never been an input signal at input S, but that reset input R is held at its normal potential of +E, the operation of the circuit will be as follows. At time period 1 (Figure 5) source PP—1 goes positive and sends a pulse through coil 41 (which has low impedance due to the lack of any prior input signal) to coil 54. At this moment, source PP—2 is at +4E volts and has cut off rectifier 52 enabling current to flow via the path 55—56—51—57 thus applying a positive magnetizing force to the core 50. The simultaneous current in coil 54 applies a negative magnetizing force to the core 50. These magnetizing forces cancel and the core 50 will stand at negative remanence. The apparatus will now pass to time period 2 (Figure 5) where source PP—2 is now negative. Rectifier 42 therefore blocks current from that source and no current flows in coil 54. Source PP—2 is now at ground potential and current may flow along the path 55—56a—51—52—PP—2 to ground. Since coil 51 has low impedance it effectively grounds wire 53 through low impedance source PP—2, hence all the potential of source 55 appears across resistor 56a. The cathode of rectifier 63 is also effectively grounded via the path 51—52—PP—2—ground. At time period 2 there is a clock pulse from generator CP which cuts off rectifier 59. Current then flows from source 77 through resistor 58, rectifier 63, coil 51, rectifier 52, source PP—2 to ground. Since all of these elements now have low impedance except resistor 58, all the potential of source 77 appears across that resistor and the rectifier 64 stands at ground potential. Hence, no current flows in coil 44. In the absence of the set input pulse when the apparatus moves to time period 3 it repeats the cycle of events recited for time period 1, and at time period 4 it repeats those for time period 2, etc.

If it now be assumed that at time period 6 a set input pulse appears at input S, it will flow through coil 44 and place a negative magnetizing force in core 40. The next positive excursion of source PP—1 will appear at time period 7 and drive the core 40 from negative remanence toward positive saturation along an unsaturated portion of the hysteresis loop, whereby coil 41 has high impedance and no current will appear at coil 54. At time period 7 source PP—2 has gone highly positive, cutting off rectifier 52 and current is flowing from source 55, resistor 56, coil 51, rectifier 57 to source +2E, applying a positive magnetizing force to the core 50. At time period 8 current will flow from source 55, resistor 56a, coil 51, rectifier 52, source PP—2 (which has zero potential) to ground. Coil 51 has high impedance to this flow of current since the core now has a negative magnetizing force thereon. Hence, substantially the full potential of source 55 appears on wire 53 and feedback wire 90 at time period 8 and cuts off rectifier 63. Also at time period 8, clock pulse generator CP has a positive excursion which cuts off rectifier 59. This allows the positive potential of source 77 to cause flow of current through resistor 58, rectifier 64, coil 44, source P (which now has zero volts) to ground. Hence a negative magnetizing force is applied to core 40 driving it to negative remanence. The next positive excursion of source PP—1, occurring at time period 9, has the same effect as the one occurring at time period 7 and the operations at time period 9 are the same as those for time period 7. Likewise, the operations at time period 10 are the same as those for time period 8. Therefore, the device will repeat itself indefinitely until the device is reset.

Resetting is accomplished by dropping the potential of input R, which is normally at +E volts, to ground. If it now be assumed that at time period 12 the reset input is lowered to zero to represent a reset input signal, the anode of rectifier 64 will be effectively grounded and hence no current may flow from positive terminal 77 through signal winding 40. Consequently the core will not be reset at time period 12 (Figure 5) and the core 40 will remain at positive remanence 12 (Figure 1). The next positive excursion of source PP—1, during time period 13, will drive the core 40 to positive saturation and produce a pulse in the output 43 which will flow through the signal winding 54. Hence the device has now been restored to the condition described in connection with time periods 1 and 3 and all of the description of the operation of non-complementing amplifier NC and the gate G applicable to time periods 1 and 3 are equally applicable to time period 13. Likewise, the descriptions given in connection with time periods 2 and 4 are equally applicable to time period 14. It follows that once the reset input pulse at time period 12 has been received, the apparatus will continue in the stable state just described until another set input pulse is received at S.

It is noted that following the set input pulse at time period 6 the output terminal 53 had a large positive potential thereon during both odd and even numbered time periods. Following the reset input pulse at time period 12, the output terminal 53 has a large positive potential during the odd numbered time periods and zero potential during the even numbered time periods. If only the even numbered time periods are considered (as would be true in most applications of the invention), the device has an output at 53 during its first stable state (following a set input at S) and no output in its second stable state (following a reset input at R).

The positive source 77, resistor 58, rectifier 59, resistor 60, negative source 61, rectifier 62, rectifier 63 and rectifier 66, constitute a diode gate with three control inputs. These control inputs are the cathodes of rectifiers 59, 63 and 66 respectively. The output of the diode gate is connected to the anode of rectifier 64.

Figure 6:
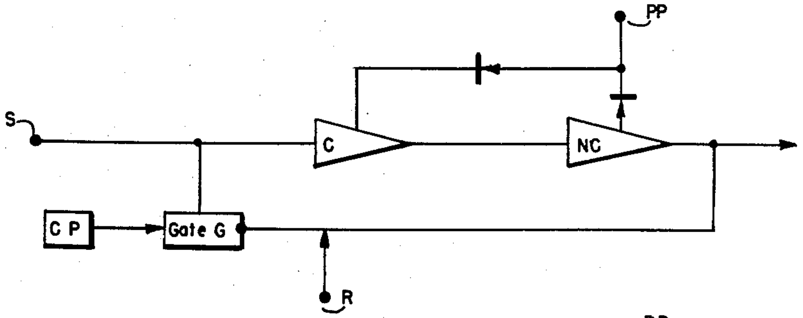
Figure 6 is a block diagram of the device of Figure 4.
Figure 7:
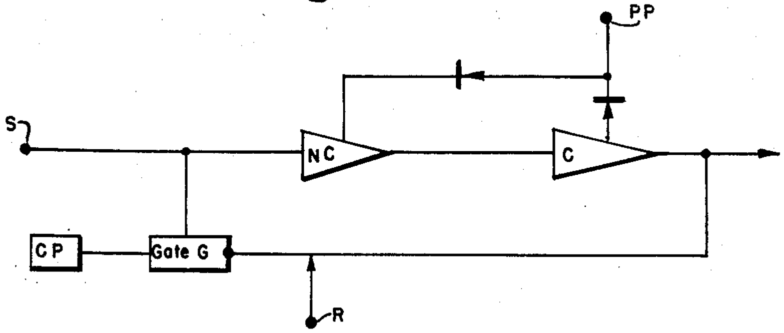
Figure 7 is a block diagram of a modified form of Figure 4.

Figure 6 is a block diagram of the circuit of Figure 4. It is illustrated merely to enable the modified form of the invention of Figure 7 to be readily understood. Figure 7 is identical with Figure 6 except the complementing and non-complementing magnetic amplifiers have been interchanged in position. Otherwise the circuit is identical and needs no further explanation.

I claim to have invented:

1. In a bistable device, a source of spaced power pulses, an output point, magnetic amplifier means for controlling the flow of current from said source to said output point, said amplifier including a signal winding, and means controlling the energization of said signal winding thereby to control said flow of current comprising all of the following: a set input connected to said signal winding for energizing it in response to a set input signal; a first terminal having a positive potential thereon; a second terminal having a negative potential thereon; a first resistor, a rectifier and a second resistor connected in that order between said terminals with the rectifier having such polarity as to allow current normally to flow from one terminal to the other, said resistors having such relative values that at least one side of said rectifier is substantially at ground potential when the potentials of said terminals are the only potentials applied to said rectifier; a source of clock pulses connected to said rectifier to cut it off selectively and thus raise the potential of said one side of the rectifier toward the potential of the terminal to which it is connected; said clock pulses having the same repetition rate as the power pulses; a rectifier connecting said one side of the first-named rectifier to one side of said signal winding to energize it when said one side of the first-named rectifier rises substantially above ground potential; feedback means connecting said output point to said one side of said first-named rectifier to effectively ground it in response to feedback potentials; and a reset input for grounding said one side of the first-named rectifier in response to a reset input signal.

2. A bistable device as defined in claim 1 in which said magnetic amplifier means comprises a complementing parallel type of amplifier, and delay means comprising a reactor connected to the output of said amplifier means, said source of clock pulses producing its pulses during the spaces between said power pulses.

3. A bistable device as defined in claim 1 in which said magnetic amplifier means comprises a complementing parallel type of amplifier, and delay means comprising a condenser connected to the output of said amplifier means.

4. A bistable device as defined in claim 1 in which said magnetic amplifier means comprises first and second magnetic amplifiers connected in cascade, one of said magnetic amplifiers comprising a complementing amplifier and the other of said amplifiers comprising a non-complementing amplifier, said source of clock pulses producing its pulses during the spaces between the power pulses applied to the first magnetic amplifier.

5. A bistable device as defined in claim 1 in which said magnetic amplifier means comprises a complementing magnetic amplifier, a non-complementing magnetic amplifier connected to the output of said complementing amplifier, said source of power pulses feeding said complementing magnetic amplifier, the source of clock pulses producing its pulses during the spaces between the power pulses fed to said complementing magnetic amplifier.

6. A bistable device as defined in claim 1 in which said magnetic amplifier means comprises a non-complementing magnetic amplifier, a complementing magnetic amplifier connected to the output of said non-complementing amplifier, said source of spaced power pulses feeding said non-complementing magnetic amplifier, the source of clock pulses producing its pulses during the spaces between the power pulses fed to said non-complementing magnetic amplifier.

7. In a bistable device, a source of spaced power pulses, an output point, a magnetic amplifier having delay means coupled to the output thereof for controlling the flow of current from said source to said output point, said magnetic amplifier comprising a core of magnetic material having a control winding thereon, and means for controlling the energization of said control winding thereby to control said flow of current, said last-named means comprising a source of clock pulses having the same repetition rate as said power pulse source, a gate having a first input thereof connected to said source of clock pulses, feedback means connecting said output point to a second input of said gate, said gate being controlled by the said feedback means and the said source of clock pulses to energize said signal winding in the absence of current flow to said output point thereby to retain the device in a first stable state represented by no current flow to said output point, a set input coupled to said signal winding for selectively changing the output of the device to another stable state represented by current flow to said output point, and a reset input for interrupting the effect of the feedback means to flip the device back to its first stable state.

8. In a bistable device, magnetic amplifier and delay means which normally produces an output signal of one polarity in the absence of an input signal and no output signal in the presence of an input signal of the other polarity, a set input for providing an input signal to the first-named means, a gate for providing input signals of said other polarity to the first-named means, and feedback means controlling said gate with said output signals, said gate including means which inhibits an input signal to the first-named means in response to potential of the first polarity in the feedback means.

9. A bistable device as defined in claim 8 including reset means which in response to a reset signal renders any feedback potential ineffective.

10. In a system having feedback, magnetic amplifier and delay means for producing an output signal of one polarity and controlled by input signals of the other polarity, a gate normally tending to apply an input signal of said other polarity to said first-named means, and feedback means for feeding a part of the output signal to said gate to cancel at least part of the input signals of said other polarity that the gate would otherwise feed to the first-named means.

11. In a system as defined in claim 10, a set input for applying an input signal of said other polarity to the first-named means, and a reset input operable in response to a reset signal to cancel the effect of the feedback potential.

12. An electrical circuit having two stable states comprising a source of spaced power pulses, an output point, a complementing magnetic amplifier for controlling the flow of pulses from said source to said output point, said amplifier having a signal input, a clock source producing control pulses during the spaces between the pulses in the output of said amplifier, delay means coupled to the output of said amplifier for applying delayed pulses to said output point in response to occurrence of pulses in the output of said amplifier, a gate having its output connected to said signal input and having one input thereof controlled by said clock pulses, and feedback means between the output of said delay means and another input of said gate whereby the output of said gate is jointly controlled by said clock source and said feedback means for holding the circuit in an output producing state when placed therein and for holding it in a non-output producing state when placed therein.

13. An electrical circuit as defined in claim 12 including a set input means connected to said signal input for selectively placing the circuit in one stable state.

14. An electrical circuit as defined in claim 13 including reset input means operable to effectively inhibit energization of said signal input in response to a reset input signal.

15. In a bistable device, a complementing magnetic amplifier comprising a saturable core having power and signal windings thereon, a source of spaced power pulses, an output terminal, means interconnecting said power winding to said source and to said output terminal so that the impedance of said power winding controls the flow of said power pulses to said output terminal, delay means for delaying output pulses reaching said output terminal so that at least part of each such output pulse occurs during the spaces between successive ones of said power pulses, feedback means connected to said output terminal, a source of clock pulses, a gate having its output coupled to said signal winding and having inputs controlled by said feedback means and by said source of clock pulses whereby the output of said gate controls the energization of said signal winding, a set input source directly coupled to said signal winding for energizing the signal winding in response to a set input signal, and a reset input source coupled to said signal winding via said gate for preventing energization of said signal winding in response to a reset input signal.

16. In an electrical circuit having two stable states, magnetic amplifier and delay means which produces an output in the absence of an input signal and produces no output in response to an input signal, a diode gate having three control inputs, the output of the diode gate controlling the first-named means and providing an input signal therefor, said first-named means having a source of spaced power pulses for energizing it, the output signals of the first-named means being delayed so that they occur during the spaces between said power pulses, a source providing clock pulses of the same repetition rate as the power pulses, said source of clock pulses being connected to one of the control inputs of the diode gate, feedback means connecting the output of the first-named means to another of said control inputs, and a reset input connected to the third control input of the diode gate, and a set input for applying an input signal to the first-named means.

17. In a bistable device, magnetic amplifier and delay means including a source of spaced pulses for energizing the same and providing an output signal of one polarity in the absence of an input signal and no output in response to an input signal of the other polarity, a gate which may apply an input signal of said other polarity to the first-named means, said gate having three control inputs, said gate producing an input signal for the first-named means of said other polarity when the three control inputs all receive a potential of said one polarity, a source providing clock pulses having the same repetition rate as the power pulses, the last-named source being connected to the first control input to periodically energize it with potential of said one polarity, a reset input that normally applies to the second control input a potential of said one polarity but reduces the potential to cut off the gate when a reset input signal is received, and feedback means for normally holding said third control input at a potential of said one polarity but which in response to an output signal of the first-named means lowers the potential on the third control input and cuts off said gate, and a set input for applying an input signal to the first-named means.

18. In a bistable device, a complementing magnetic amplifier having an output, a source of spaced power pulses for energizing said magnetic amplifier, delay means connected to the output of said amplifier to delay any output signals until they occur during the spaces between said power pulses, said magnetic amplifier having an input, a gate having an output connected to said input and having three control inputs all of which must have potentials of predetermined polarities in order for the gate to apply an input signal to the amplifier input, a source of clock pulses for energizing the first of the control inputs with pulses of polarity requisite for producing an output, a reset input for normally applying to the second control input a potential of polarity requisite for producing an output but which lowers the potential at the second control input so that the gate does not have an output in response to a reset input signal, feedback means that normally holds the third control input at a potential of polarity requisite for producing an output but lowers the potential at the third control input to inhibit a gate output in response to a signal at the output of the delay means, and a set input controlling the input of the magnetic amplifier.

19. A bistable device comprising an amplifier having an input and an output, means controlling the bistable output state of said device comprising a gate having at least three inputs and an output, means coupling said gate output to said amplifier input, a source of spaced regularly occurring clock pulses coupled to a first one of said plural gate inputs, feedback means coupling the output of said amplifier to a second one of said gate inputs, and a first source of selective input pulses coupled to a third one of said plural gate inputs, whereby the state of energization of said amplifier input is jointly dependent upon the relative potentials applied to said gate inputs by said clock pulse source, feedback means, and input pulse source.

20. The combination of claim 19 including a second source of selective input pulses coupled directly to said amplifier input for further controlling the bistable output state of said device.

21. In combination, first and second pulse type magnetic amplifiers, one of said amplifiers being of the complementing type and the other of said amplifiers being of the non-complementing type, means coupling the output of said first amplifier to the input of said second amplifier whereby the output state of said first amplifier controls the output state of said second amplifier, a gating circuit having at least two inputs and an output, a source of regularly spaced clock pulses coupled to one of said gate inputs, means coupling the output of said second amplifier to the other of said gate inputs, and means coupling said gate output to the input of said first magnetic amplifier whereby said clock source is normally operative to feed regularly spaced control signals to the input of said first amplifier via said gating means when said second amplifier has a given output state, said control signals being operative to so control the output of said first amplifier and the input of said second amplifier as to maintain said given output state at the output of said second amplifier, and means operative to selectively switch said second amplifier from said given output state to an opposite output state thereby to inhibit the feeding of said regularly spaced control signals to the input of said first amplifier via said gating means whereby said second amplifier maintains its said opposite output state.

References Cited in the file of this patent

UNITED STATES PATENTS

| | | |
|---|---|---|
| 2,709,798 | Steagall | May 31, 1955 |
| 2,710,952 | Steagall | June 14, 1955 |
| 2,731,203 | Miles | Jan. 17, 1956 |
| 2,786,147 | Kaufmann | Mar. 19, 1957 |

UNITED STATES PATENT OFFICE
CERTIFICATE OF CORRECTION

Patent No. 2,838,746 June 10, 1958

John Presper Eckert, Jr.

It is hereby certified that error appears in the printed specification of the above numbered patent requiring correction and that the said Letters Patent should read as corrected below.

Column 5, line 30, for "course" read -- core --; column 6, line 56, for "source P" read -- source BP --.

Signed and sealed this 4th day of November 1958.

(SEAL)

Attest:

KARL H. AXLINE
Attesting Officer

ROBERT C. WATSON
Commissioner of Patents